US012531877B2

(12) United States Patent
Smith et al.

(10) Patent No.: US 12,531,877 B2
(45) Date of Patent: Jan. 20, 2026

(54) SUPPLY CHAIN ATTESTATION TRANSPARENCY AND AUTHORIZATION

(71) Applicant: Intel Corporation, Santa Clara, CA (US)

(72) Inventors: Ned M. Smith, Beaverton, OR (US); Rajesh Poornachandran, Portland, OR (US); Sunil K. Cheruvu, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 18/146,687

(22) Filed: Dec. 27, 2022

(65) Prior Publication Data

US 2024/0214390 A1 Jun. 27, 2024

(51) Int. Cl.
*H04L 9/40* (2022.01)
(52) U.S. Cl.
CPC ........ *H04L 63/126* (2013.01); *H04L 63/1416* (2013.01)
(58) Field of Classification Search
CPC ... H04L 9/3234; H04L 9/3236; H04L 9/3247; H04L 2209/127; H04L 63/0823; H04L 63/126
See application file for complete search history.

(56) References Cited

U.S. PATENT DOCUMENTS

| 8,874,900 | B2 | 10/2014 | Brickell et al. |
| 9,256,742 | B2 | 2/2016 | Raghuram et al. |
| 9,363,241 | B2 | 6/2016 | Deutsch et al. |
| 9,935,773 | B2 | 4/2018 | Sarangdhar et al. |
| 10,938,570 | B2 | 3/2021 | Misoczki et al. |
| 11,595,213 | B2* | 2/2023 | Moran ................ H04L 63/0281 |
| 11,809,545 | B2 | 11/2023 | Scarlata et al. |
| 2010/0031047 | A1* | 2/2010 | Coker, II ............ H04L 63/0281 713/176 |
| 2014/0173709 | A1 | 6/2014 | Eldar et al. |
| 2019/0020647 | A1* | 1/2019 | Sinha .................... H04L 63/061 |
| 2019/0044732 | A1 | 2/2019 | Reinders et al. |
| 2019/0364042 | A1 | 11/2019 | Liu et al. |
| 2021/0256508 | A1* | 8/2021 | Moy .................... G06Q 50/265 |

FOREIGN PATENT DOCUMENTS

EP 3758280 A1 12/2020

OTHER PUBLICATIONS

H. Birkholz, et al., "An Architecture for Trustworthy and Transparent Digital Supply Chains", draft-birkholz-scitt-architecture-02. SCITT Architecture. Internet-Draft. Oct. 24, 2022, 37 pages.
H. Birkholz, et al., "Remote Attestation Procedures Architecture", draft-ietf-rats-architecture-22. RATS Arch & Terms. Internet-Draft. Huawei Technologies, Sep. 28, 2022, 58 pages.

* cited by examiner

*Primary Examiner* — Paul E Callahan
(74) *Attorney, Agent, or Firm* — Nicholson De Vos Webster & Elliott LLP

(57) ABSTRACT

The technology described herein includes receiving a first reference integrity manifest (RIM) and a first proto-RIM from a first endorser, the first endorser asserting authority, by the first RIM and the first proto-RIM, to supply first attestation reference values for a computing device; storing the first proto-RIM in a RIM transparency database; notarizing the first proto-RIM; and providing the first RIM and the notarized first proto-RIM to a verifier of the computing device.

24 Claims, 12 Drawing Sheets

SUPPLY CHAIN ATTESTATION TRANSPARENCY AND AUTHORIZATION

FIELD OF THE DISCLOSURE

This disclosure relates generally to security in computing systems, and more particularly, to supply chain attestation transparency and authorization in computing systems.

BACKGROUND

A cloud computing environment including edge computing devices and cloud computing servers requires trust between the computing systems. Trust depends on attestation integrity, and attestation integrity depends on supply chain integrity. Edge-cloud supply chain integrity is challenged by the large number of suppliers of edge computing devices and the diverse geo-political conditions that govern the suppliers. Consequently, suppliers may not behave in the best interests of other suppliers, attestation verifiers or network owners. Additionally, suppliers may be compromised by bad actors. Miscreant suppliers may forge reference integrity manifests (RIMs) used by verifiers to assess correctness of attestation evidence or to assert trustworthiness claims about an edge computing device or a component of an edge computing device that is false. Supply chain certificate authorities are obliged to issue certificates to all suppliers because there is no reliable source of supplier reputation.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
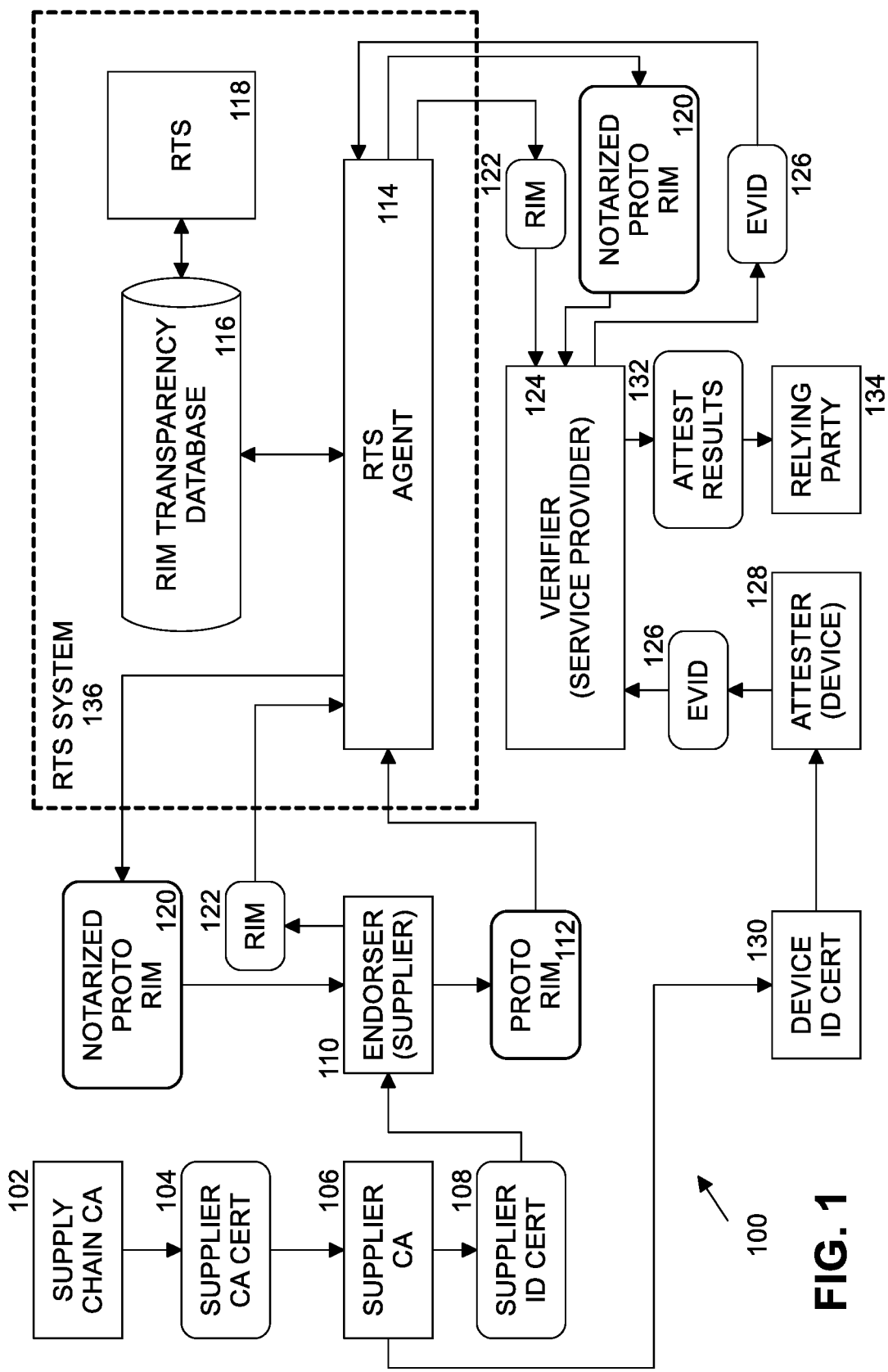
FIG. 1 illustrates a computing system environment in an implementation.

The technology described herein uses supplier-specific reference integrity manifest (RIM) authorization to enable an attestation verifier a greater ability to detect competing RIMs (e.g., when two or more suppliers issue RIMs that describes competing reference values for the same computing system or component of a computing system). Additionally, a RIM transparency service (RTS) is provided to detect competing RIMs and to perform additional fraud detection. The RTS maintains an archive of previously issued RIMs through cooperation with a supply chain ecosystem. There may be multiple RTS instances that cater to specific geo-political or business interests, but the RTS instances agree to share transparency data. Sharing transparency data may be facilitated by distributed ledger technology (DLT) to ensure fair play when managing the lifecycle of transparency data.

In an implementation, a new form of manifest called a prototype RIM (also referred to herein as a proto-RIM) is introduced that enables delegation of reference value provider authority. Often suppliers may be acquired, go out of business, or cooperate with other suppliers, etc., resulting in the need to describe a different entity (than the one that originally produced the computing system or component of a computing system) as an authorized RIM provider. The prototype RIM may have the same structure and schema as the RIM, but proto-RIMs do not include reference values. Instead, proto-RIMs include the names of measurements that a particular computing system or component of a computing system is authorized to include in the RIM. The RIM issuer uses the proto-RIM to direct which reference measurements to include in the RIM. A verifier uses the proto-RIM to verify that the RIM issuer organization only supplied measurements that were delegated to the RIM issuer organization by the original manufacturer of the computing system or component of a computing system.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor circuitry" or "hardware resources" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, a computing system can be, for example, a server, a disaggregated server, a personal computer, a workstation, a self-learning machine (e.g., a neural network), a mobile device (e.g., a cell phone, a smart phone, a tablet (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. A computing system may include one or more dynamic random-access memories (DRAMs) to store data.

As used herein components of computing systems of the computing system environment include central processing units (CPUs), graphics processing units (GPUs), field programmable gate arrays (FPGAs), application specific integrated circuits (ASICs), digital signal processors (DSPs), IP blocks, communications circuitry, computational storage devices, storage and memory devices (including solid state drives (SSDs), dual inline memory modules (DIMMs), etc., HW accelerators (including inference accelerators), XPUs, performance monitoring units (PMUs), or other computing devices supporting performance of workloads. Computing systems and/or computing system components may also be referred to as computing devices herein.

In Remote Attestation Procedures (RATs), one peer, called the Attester, produces believable information about itself, called Evidence, to enable a remote peer, called the Relying Party, to decide whether to consider that Attester a trustworthy peer or not. RATs are facilitated by an additional vital party, called the Verifier. The Verifier appraises Evidence via appraisal policies and creates Attestation Results to support Relying Parties in their decision process. The Attester role is assigned to entities that create Evidence that is conveyed to a Verifier. The Verifier role is assigned to entities that use the Evidence, any Reference Values from Reference Value Providers, and any Endorsements from Endorsers, by applying an Appraisal Policy for Evidence to assess the trustworthiness of the Attester. This procedure is called the appraisal of Evidence. Subsequently, the Verifier role generates Attestation Results for use by Relying Parties.

The Appraisal Policy for Evidence might be obtained from the Verifier Owner via some protocol mechanism or might be configured into the Verifier by the Verifier Owner, or might be programmed into the Verifier, or might be obtained via some other mechanism. The Relying Party role is assigned to an entity that uses Attestation Results by applying its own appraisal policy to make application-specific decisions, such as authorization decisions. This procedure is called the appraisal of Attestation Results. The Appraisal Policy for Attestation Results might be obtained from the Relying Party Owner via some protocol mechanism or might be configured into the Relying Party by the Relying Party Owner or might be programmed into the Relying Party, or might be obtained via some other mechanism. An Endorser is a role performed by an entity (typically a manufacturer) whose Endorsements may help Verifiers appraise the authenticity of Evidence and infer further capabilities of the Attester. Reference Values comprise a set of values against which values of Claims can be compared as part of applying an Appraisal Policy for Evidence. Reference Values are sometimes referred to as known-good values, golden measurements, or nominal values, although those terms typically assume comparison for equality, whereas here Reference Values might be more general and be used in any sort of comparison.

Evidence is a set of Claims about the target environment that reveal operational status, health, configuration or construction that have security relevance. Evidence is appraised by a Verifier to establish its relevance, compliance, and timeliness. Claims need to be collected in a manner that is reliable such that a target environment cannot lie to the attesting environment about its trustworthiness properties. Evidence needs to be securely associated with the target environment so that the Verifier cannot be tricked into accepting Claims originating from a different environment (that may be more trustworthy). Evidence also must be protected from an active on-path attacker who may observe, change or misdirect Evidence as it travels from Attester to Verifier. The timeliness of Evidence can be captured using Claims that pinpoint the time or interval when changes in operational status, health, and so forth occur.

An Endorsement is a secure statement that some entity (e.g., a manufacturer) vouches for the integrity of the computing device's various capabilities such as claims collection, signing, launching code, transitioning to other environments, storing secrets, and more. For example, if the device's signing capability is in hardware, then an Endorsement might be a manufacturer certificate that signs a public key whose corresponding private key is only known inside the device's hardware. Thus, when Evidence and such an Endorsement are used together, an appraisal procedure can be conducted based on appraisal policies that may not be specific to the device instance, but merely specific to the manufacturer providing the Endorsement. For example, an appraisal policy might simply check that devices from a given manufacturer have information matching a set of Reference Values, or an appraisal policy might have a set of more complex logic on how to appraise the validity of information.

Attestation Results are the input used by the Relying Party to decide the extent to which the Relying Party will trust a particular Attester and allow it to access some data or perform some operation. Attestation Results may carry a Boolean value indicating compliance or non-compliance with a Verifier's appraisal policy or may carry a richer set of Claims about the Attester, against which the Relying Party applies its Appraisal Policy for Attestation Results. The quality of the Attestation Results depends upon the ability of the Verifier to evaluate the Attester. Different Attesters have a different Strength of Function, which results in the Attestation Results being qualitatively different in strength. An Attestation Result that indicates non-compliance can be used by an Attester (in the passport model) or a Relying Party (in the background-check model) to indicate that the Attester should not be treated as authorized and may be in need of remediation. In some cases, it may even indicate that the Evidence itself cannot be authenticated as being correct.

FIG. 1 illustrates a computing system environment 100 in an implementation. A supply chain certificate authority (CA) 102 issues a supplier CA certificate (cert) 104 to a supplier CA 106. Supplier CA 106 issues a supplier ID certificate 108 to a supplier 110 of a device 128. Device 128 comprises a computing system or a component of a computing system. Supplier CA 106 also issues a device ID certificate 130 to device 128. In an implementation, supplier 110 operates as an Endorser. Supplier 110 may provide a RIM 122 and a proto-RIM 112 to RIM transparency service (RTS) system 136.

In an implementation, RTS system 136 provides additional security for computing system environment 100. RTS system 136 includes at least one RTS agent 114, at least one RTS 118 and at least one RIM transparency database 116. In an implementation, RIM transparency database 116, stored in a memory of a computing system, comprises distributed ledger technology (DLT), such as a blockchain. Any artifact used in the operation of the attestation system shown in the computing system environment 100 may be stored in RIM transparency database 116. RTS agent 114 controls input to RIM transparency database 116. In an implementation, RTS agent 114 is a blockchain miner node. RTS 118 performs analytics processing on contents of RIM transparency database 116, which may include anti-fraud analysis, and may perform consistency checks across multiple artifacts that describe or contain attestation related data. RTS 118 acknowledges and/or notarizes that proto-RIM 112 is authentic (including the consensus opinion about which Endorser is authorized to supply reference measurements (e.g., Reference Values) to attestation evidence by countersigning (or by other means of cryptographically acknowledging the named measurements and measurement supplier as authentic)) and notarizing the proto-RIM 112 to produce notarized proto-RIM 120. RTS 118 may convey, publish, store-and-forward the notarized proto-RIM 120 to an entity that operates in an attestation role, such as a Verifier, Endorser and Relying Party. An attestation role entity (e.g., a Verifier, Endorse, or Relying Party) trusts the RTS 118 by configuring a trust anchor (e.g., a public key infrastructure (PKI) certificate public key) of the entity for operations and/or tasks that the entity is expected to follow or perform as described in the RIM. RTS agent 114 is similarly trusted for the described operations and/or tasks.

The RIM 122 contains structures that name the various components of computing systems and the type of measurements the components are allowed to have. The RIM may also identify the entity who is expected to supply measurements (e.g., Reference Values) for the named measurements.

In an implementation, RTS 118 and RTS agent 114 are separate entities to achieve a security objective of separation of duties. In another implementation, these duties may be combined (e.g., RTS 118 and RTS agent 114 may be combined into a single entity). In another implementation, the duties of RTS 118 and RTS agent 114 may be further divided among multiple entities.

An Endorser (such as supplier 110) that possesses authorization to supply Reference Values (also called reference measurements herein) for a RIM 122 may delegate authorization by producing a second proto-RIM that names a different entity (that is, other than itself). The updated proto-RIM may be sent to RTS agent 114 to establish that the new proto-RIM is the current (in force) proto-RIM and any previous proto-RIM become merely historical and not active.

If there are two RTSs that disagree regarding a proto-RIM, an audit of the RIM transparency database 116 will reveal which RTS is in error. A RTS signature means the RTS 118 checked the RIM transparency database 116 when generating the signed proto-RIM 120.

In an implementation, RIM transparency database 116 may include distributed ledger technology (DLT), which may generate a Merkel tree as a collection of digest values. The data used to generate the Merkel tree is typically outside the scope of the DLT consensus procedure. The data used to generate the digest values may be hidden (for privacy reasons) or may be archived for historical purposes. The technology described herein may use an archive functionality in RIM transparency database 116 for the RTS 118 to perform transparency checks to detect fraud. The Merkel tree establishes the sequencing that resolves naming conflicts in the absence of an entity(s) that performs governance (as described below).

If there is a single RTS 118, a fraudulent, second RIM is detected by RTS 118 when an existing first proto-RIM 112 is found in RIM transparency database 116. If there are multiple RTSs (such as RTSA and RTSB), a fraudulent, second RIM is detected by a Verifier when the Verifier discovers Evidence that points to a first RIM and the first proto-RIM and notarized first RIM. Even if a Verifier trusts both the RTSs, the RIM transparency database will store only the first entry (e.g., for the first RIM) or will rely on a supply chain governance policy to determine which Endorser is authorized to supply reference measurements.

When device 128 (e.g., a computing system or component of a computing system), operating as an Attester, is to attest the device to a service provider 124 operating as a Verifier, device 128 sends Evidence (EVID) 126 to service provider 124. Service provider 124 obtains RIM 122 and notarized proto-RIM 120 from RTS agent 114. In an implementation, RTS agent 114 gets RIM 122 and notarized proto-RIM 120 from RIM transparency database 116. Service provider 124 performs attestation of device 128 and produces Attestation Results 132. If these Attestation Results indicate that device 128 is attested to, then Relying Party 134 may communicate with device 128 knowing that the device is trusted. Evidence 126 may be forwarded by service provider 124 to RTS agent 114 for storage in RIM transparency database 116 as associated with device 128, RIM 122 and notarized proto-RIM 120.

In some scenarios, there may be multiple suppliers. Each of the multiple suppliers may be submitting RIMs and proto-RIMs for the same device 128 to RTS agent 114. RTS system 136 incorporates authorization of reference measurements (in Evidence) of the device and recognizes delegation of reference measurement authority using the proto-RIMs to provide attestation transparency and reference measurements authorization.

For example, a trusted (but compromised or malicious) supplier B attempts to create an attack RIM B where RIM A is the attack target. Supplier B hopes to confuse the Verifier (e.g., service provider 124) into accepting RIM B when verifying device A (that normally requires RIM A). The technology described herein provides three strategies for mitigating the attack. First, the Verifier checks RIM B against proto-RIM B. The RTS 118 may not issue a Proto-RIM B that describes device A unless supplier A delegated that authority to supplier B's organization. Supplier A doesn't require the use of the RTS 118 to perform the delegation as supplier A could issue the proto-RIM directly to supplier B's organization. Use of the RTS 118 for delegation is a convenience to both organizations of supplier A and supplier B. Second, the technology described herein provides for the inclusion of the intended reference value provider organization in the RIM 122. Supplier A's certificate contains the organization name that is authorized to supply Reference Values. The organization name is included in RIM A for each measurement that is authorized by the organization. The Verifier may compare the organization name (e.g., private enterprise number (which is backed by a global registry)) or cryptographic key that is well-known that belongs to the organization, etc. The attack RIM B may supply an attack authorized by organization name, but this would differ from the device ID's certificate path that intersects with supplier A's certificate (which also contains the organization name). Unless the Verifier can be convinced the authority to provide RIM B was delegated, the Verifier will flag RIM B as possibly fraudulent. Finally, the device or component manufacturer that implements an attesting environment that collects measurements into Evidence may include the organization name that the manufacturer believes is the authorized provider of Reference Values. Since Evidence is matched to Reference Values on a measurement-by-measurement basis, the developer/manufacturer can coordinate with the RIM provider organization to agree on which organization identifier to include in Evidence. The malicious supplier B, in addition to forging RIM B, must modify the device/component attesting environment to return the name of organization B instead of organization A. Since every device or component must be modified (compromised) for this attack to be successful, the skill level required of the attacker is greatly increased. Two or more of these strategies may be combined to further strengthen mitigation against supply chain misbehavior.

In an implementation, RTS 118 may accept other attestation related data including certificates (e.g., certificate transparency), and Evidence to further improve detection of malicious or simply negligent behavior. The RTS 118 may employ artificial intelligence (AI) deep learning (DL)/machine learning (ML) techniques to automate fraud detection or other inferencing. Over the course of time, the DL/ML based system could construct a graph of a bill of materials (BoM) list dependencies/versions and optimize the Verifier's lookup capabilities.

In future, the millions of open-source software (SW) ingredients that are used to constitute the cloud computing and edge computing technologies will require supply chain integrity and the BoM graph may be useful for performant attestation services. A hierarchy of hosted and monetizable RTS services may be provided for geo-specific deployments and include an option for a system administrator mandated policy, for specific deployments such as air gapped computing systems.

In an implementation, proto-RIMs may be waterfalled from one vendor/customer to another. In a scenario, multiple vendors may be required to arrive at a consensus on all proto-RIMs for a computing system or computing system component using the BoM ingredients.

In one scenario, open-source code repositories, such as GitHub, could subscribe to the RTS system 136 and scrub open-source code for potential supplier-based violations on demand and in real-time.

Another feature after detecting a fraud is to blacklist the fraudulent proto-RIM (e.g., in the RIM transparency database 116) and potentially revoke the fraudulent supplier's CA.

Transparency DB/DLTs from separate domains could use an asset transfer protocol (such as Secure Asset Transfer Protocol) to create federated RIM transparency databases that allow RTSs to identify proto-RIM issuers who are competing to issue duplicate proto-RIMs with different delegations. The RTSs may apply a first come, first served policy (FCFS) where the first to claim ownership of the RIM component is the de facto authority for supplying reference measurements. This also establishes who is authorized to delegate to a different supply chain entity.

Alternatively, a permissioned RIM transparency database could be used as a governing body that delegates authority to issue proto-RIMs (rather than by FCFS convention). A proto-RIM delegation board (PDB) may use smart contracts and voting to collectively determine which supply chain entities are most authoritative when determining who should issue the proto-RIM.

Figure 2:
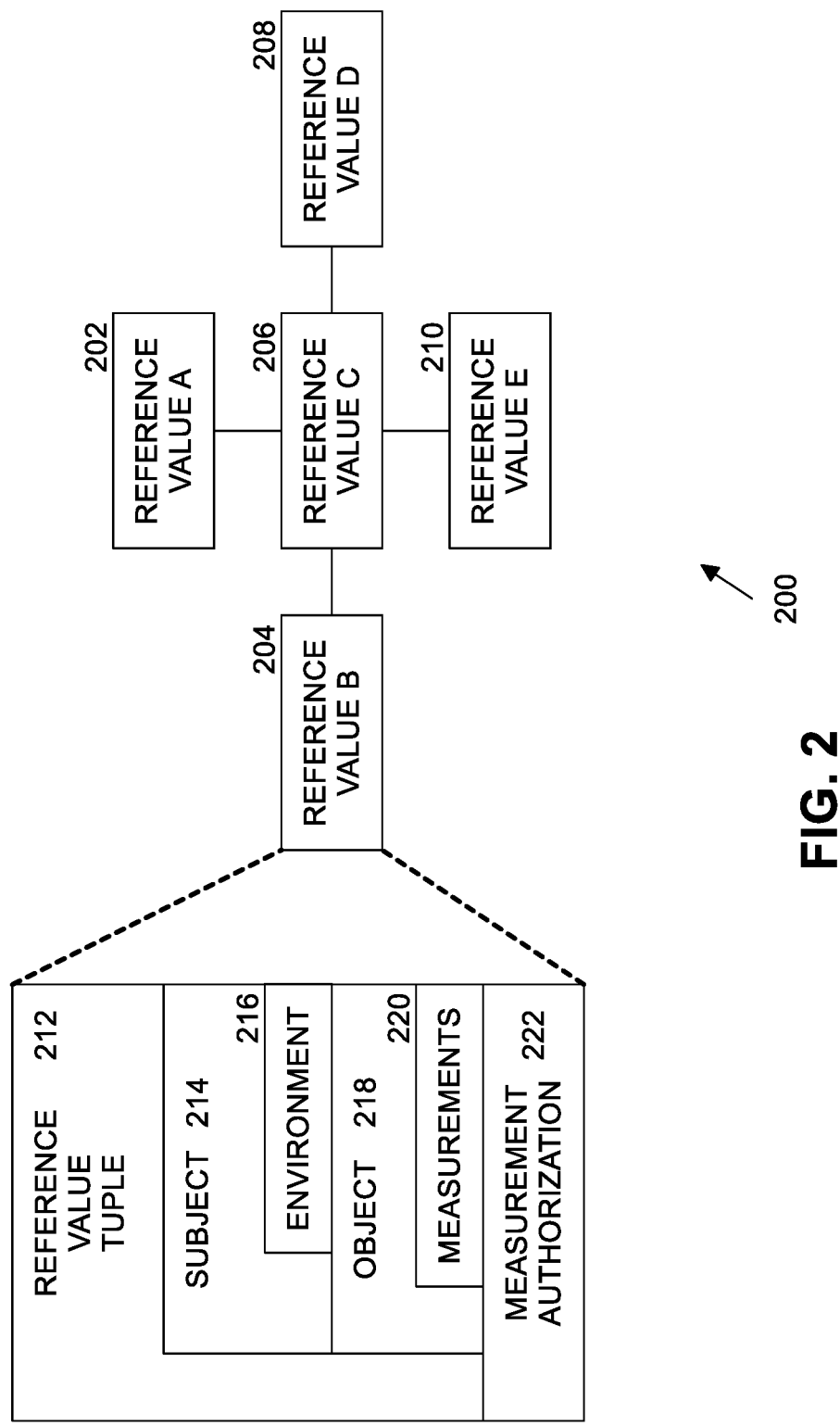
FIG. 2 illustrates a sample reference integrity manifest (RIM) according to an implementation.

FIG. 2 illustrates a sample reference integrity manifest (RIM) 200 according to an implementation. RIM 200 includes a plurality of Reference Values. Reference Values may be interconnected in a component taxonomy, where computing system components of device 128 are related according to the taxonomy. Each computing system component includes a Reference Value. For example, Reference Values A 202, B 204, C 206, D 208 and E 210 may be related as shown. Each Reference Value includes a plurality of fields, including Reference Value tuple 212 and measurement authorization 222. The Reference Value tuple 212 includes a subject 214 including an environment 216 and an object 218 including one or more measurements 220. Environment 216 includes an identification of the computing system component (e.g., component B in this example). Measurement authorization 222 identifies a supply chain entity (e.g., supplier 110) that is authorized to provide the measurements 220 included in the object 218. In an implementation, measurements 220 include a digest of firmware of the computing system component (e.g., component B).

Figure 3:
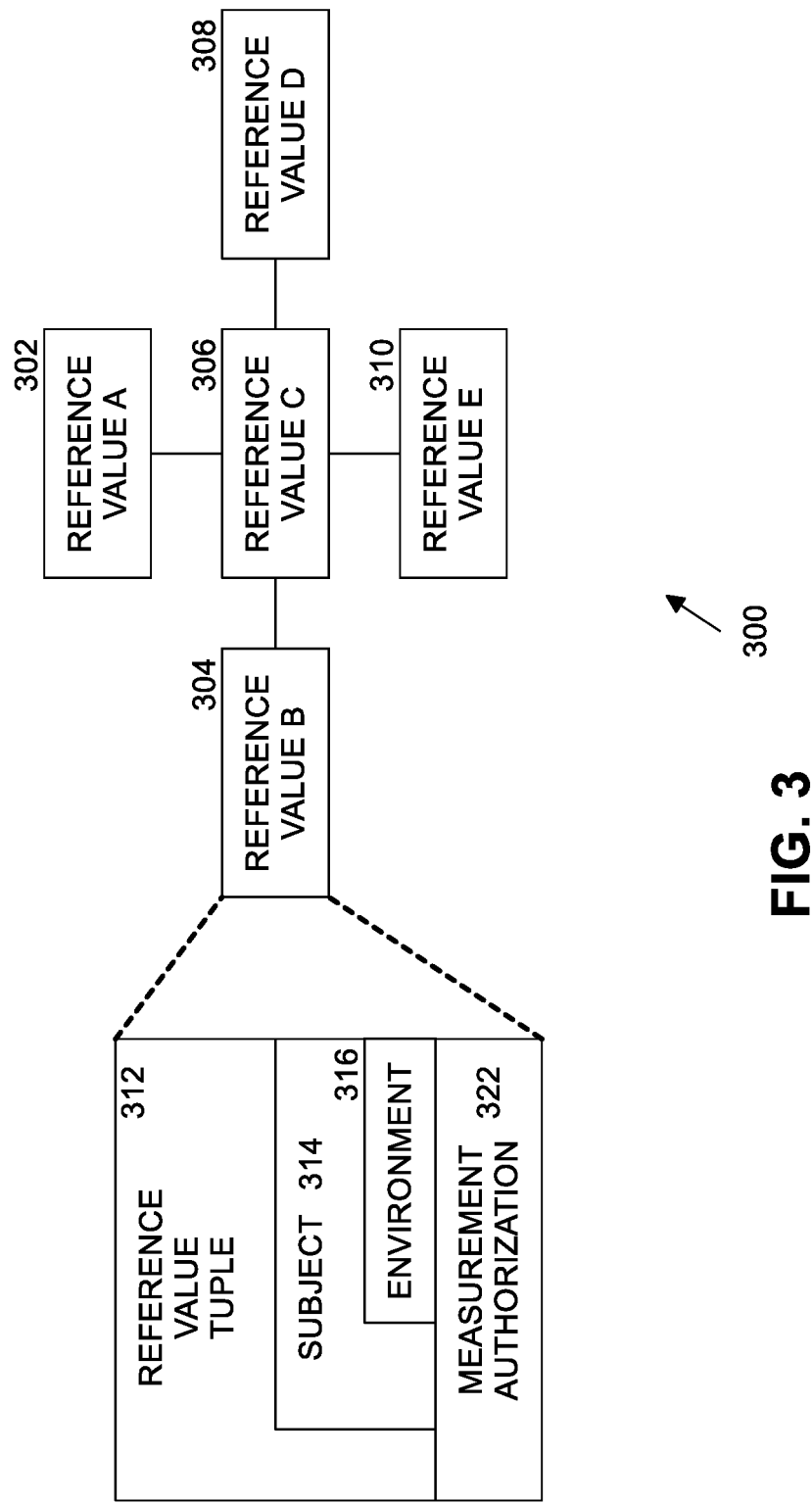
FIG. 3 illustrates a sample proto-RIM according to an implementation.

FIG. 3 illustrates a sample proto-RIM 300 according to an implementation. Proto-RIM 300 is similar to RIM 200, but proto-RIM 300 does not include an object 218 and measurements 220. For example, the component taxonomy may include Reference Values A 302, B 304, C 306, D 308, and E 310. Each Reference Value includes a plurality of fields, including Reference Value tuple 312 and measurement authorization 322. The Reference Value tuple 312 includes a subject 314 including an environment. Environment 316 includes an identification of the computing system component (e.g., component B in this example). Measurement authorization 322 identifies a supply chain entity (e.g., supplier 110) that is authorized to provide the measurements 320 included in the object 318.

In an implementation, proto-RIM 300 may include geographic and/or time bound constraints that may be vetted by RTS 118.

Figure 4:
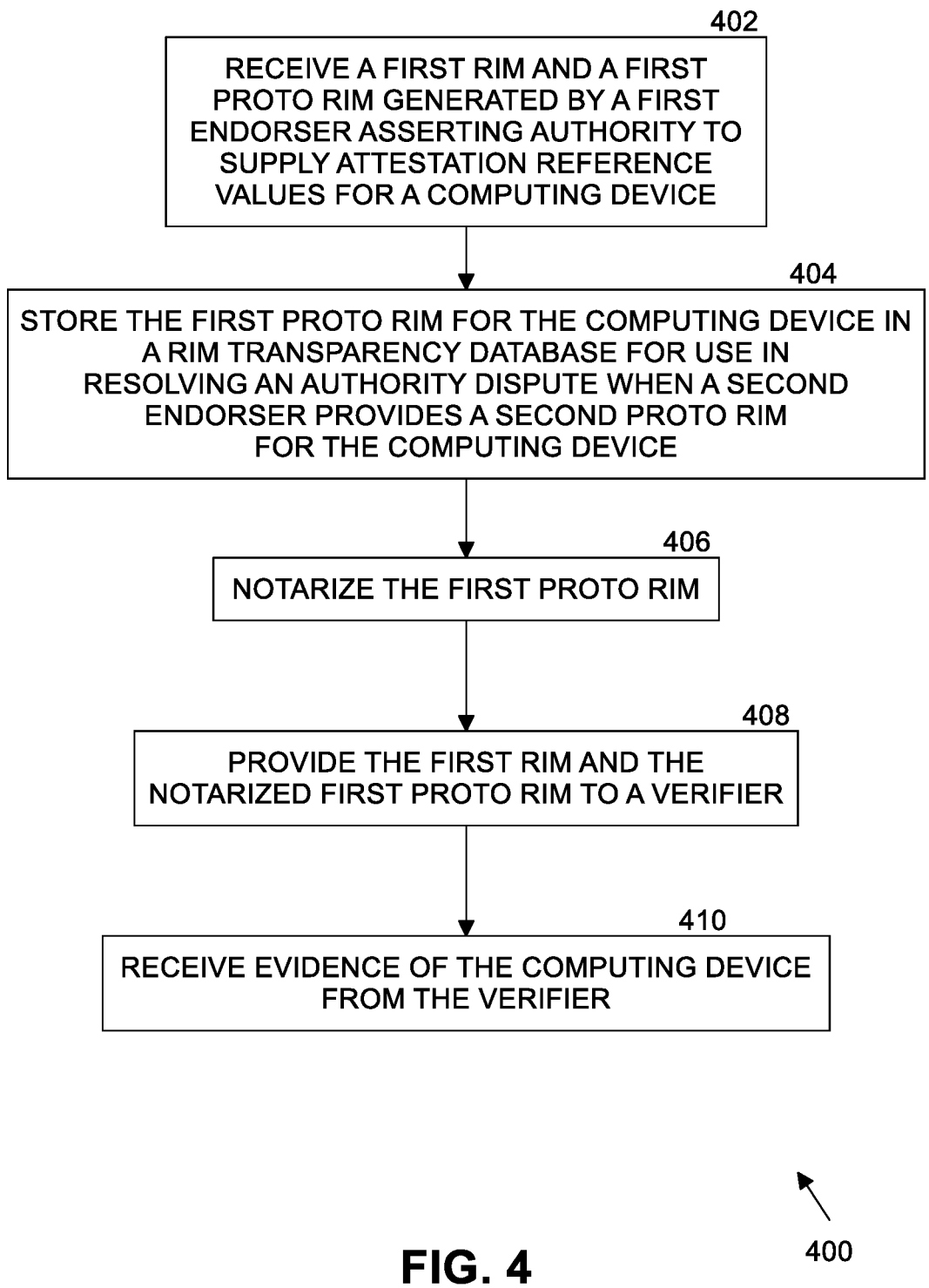
FIG. 4 illustrates attestation processing according to an implementation.

FIG. 4 illustrates attestation processing 400 according to an implementation. In an embodiment, the processing shown in FIG. 4 may be performed by RTS agent 114 and RTS 118 of RTS system 136, either as separated into distinct computing entities or together as a combined computing entity. At block 402, RTS system 136 receives a first RIM 122 and a first proto-RIM 112 generated by a first Endorser (e.g., supplier 110) asserting authority to supply attestation reference values for a computing device (e.g., device 128). At block 404, RTS system 136 stores the first proto-RIM 112 for the computing device in a RIM transparency database 116 for use in resolving an authority dispute when a second Endorser provides a second proto-RIM for the computing device. At block 406, RTS system 136 notarizes the first proto-RIM. In an implementation, notarization may include verifying the first proto-RIM and performing fraud detection processing. At block 408, RTS system 136 provides the first RIM 122 and the first notarized proto-RIM 120 to a Verifier (e.g., service provider 124). At block 410, RTS system 136 receives Evidence 126 of the computing device from the Verifier. In an embodiment, the evidence may be stored in RIM transparency database 116. Subsequently, when a second Endorser sends a second proto-RIM for the same computing device to RTS system 136, RTS system 136 detects and resolves the authority dispute between the two Endorsers.

In an implementation, resolving an authority dispute is based at least in part on analyzing one or more of the first RIM, the first proto-RIM, the second RIM, the second proto-RIM, and the Evidence. RTS 118 doesn't need to use all the above-named data, possibly only the Evidence is available or possibly only the proto-RIMs or RIMs is available. Use of more data is a stronger indication of intended authority. Nevertheless, contradictions could exist such as when the second proto RIM or RIM disagrees with the first proto RIM or RIM, respectively. A contradiction may also occur when a second Evidence disagrees with the first Evidence. The rules for establishing priority (e.g., first come, first served (FCFS), PDB) are relied upon to establish which data is authoritative.

In a scenario where a PDB does not exist, the RTS system 136 accepts the assertions in the proto-RIM as valid. All subsequent proto-RIMs naming identical components and their measurements, but with different entities authorized to supply measurement values are deemed invalid. The authority dispute is resolved by finding a proto-RIM that has no predecessor. In a scenario where a PDB is used, the RTS system 136 uses a PDB policy to determine which entities are authorized to provide which measurement values. The PDB policy may define hierarchies of components and devices that authorizes an entity to be the supplier of measurement values for the sub-tree under a node of the hierarchy. Nevertheless, a sub-tree node could have a different entity assigned by the PDB wherein such an assignment negates a higher-level assignment in the hierarchy. The authority dispute is resolved by the PDB examining the PDB policy (by walking the hierarchy) to arrive at a decision over which entity is authorized. The proto-RIM 112 may be modified by a PDB to reflect the dictates of the PDB policy. A proto-RIM signed by a PDB overrides the authority inferred from a first-come-first-served sequence set by a RIM transparency database 116 (or DLT).

Figure 5A:
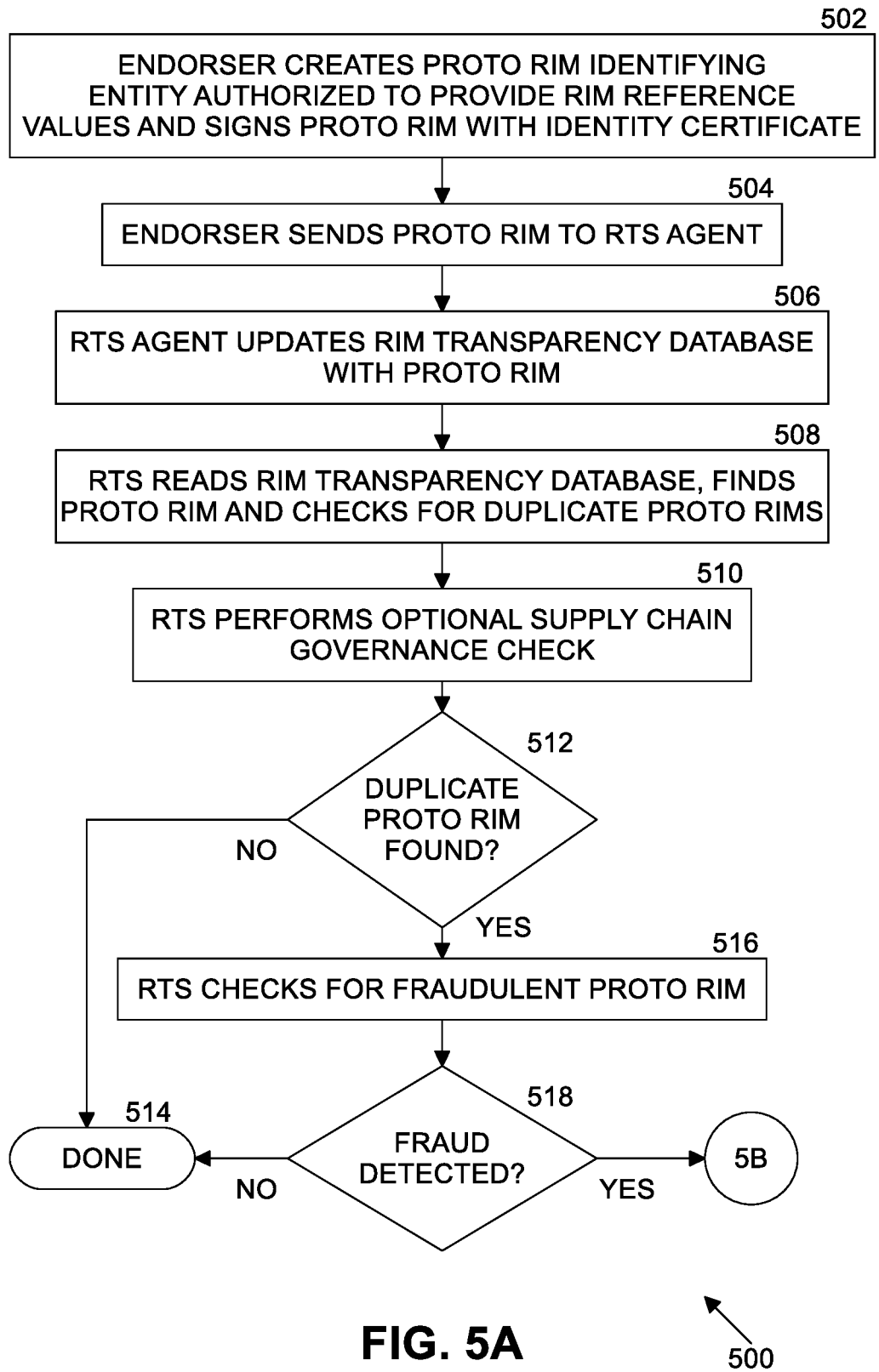
FIGS. 5A-5C illustrate attestation processing in an implementation.
Figure 5B:
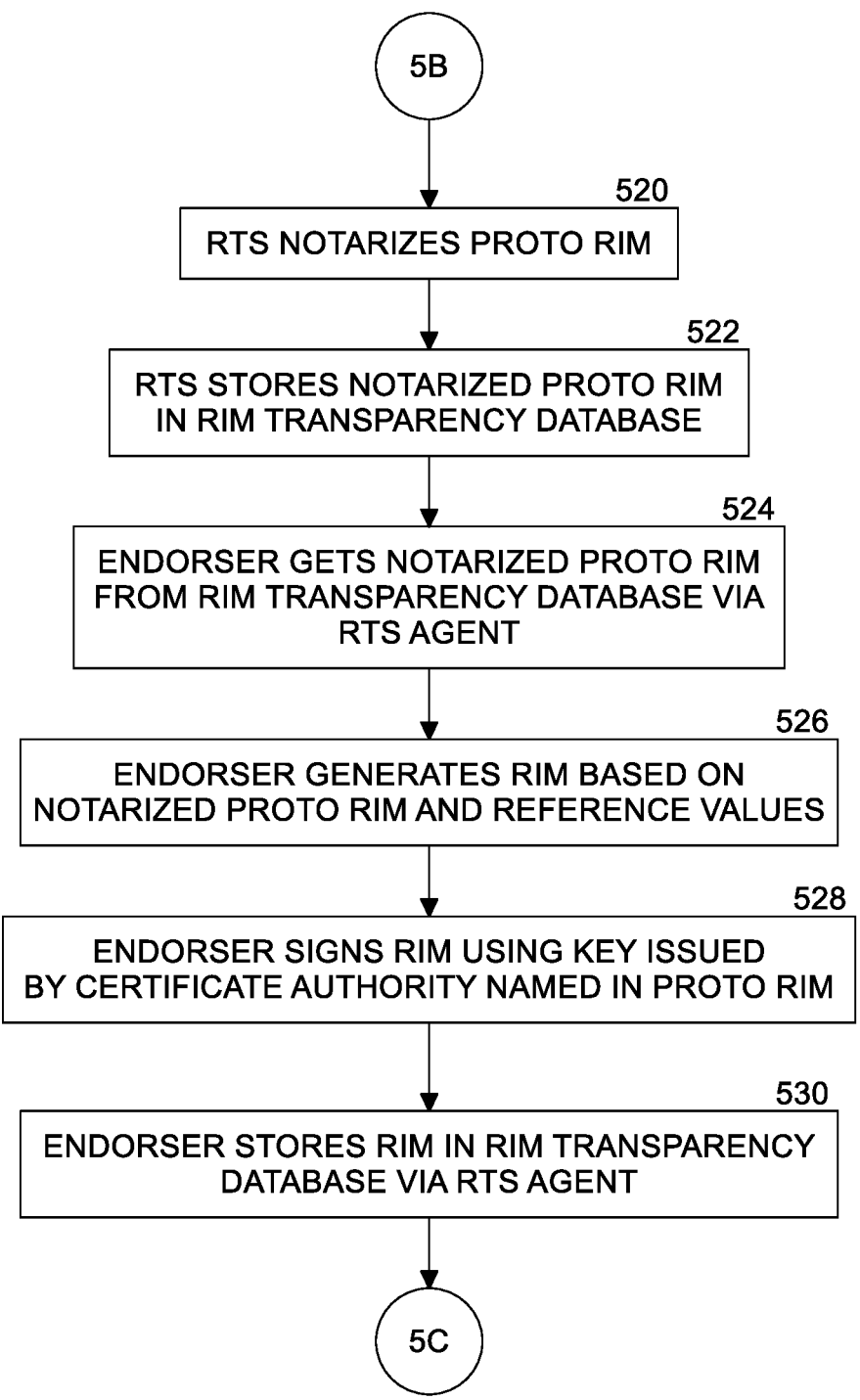
Figure 5C:
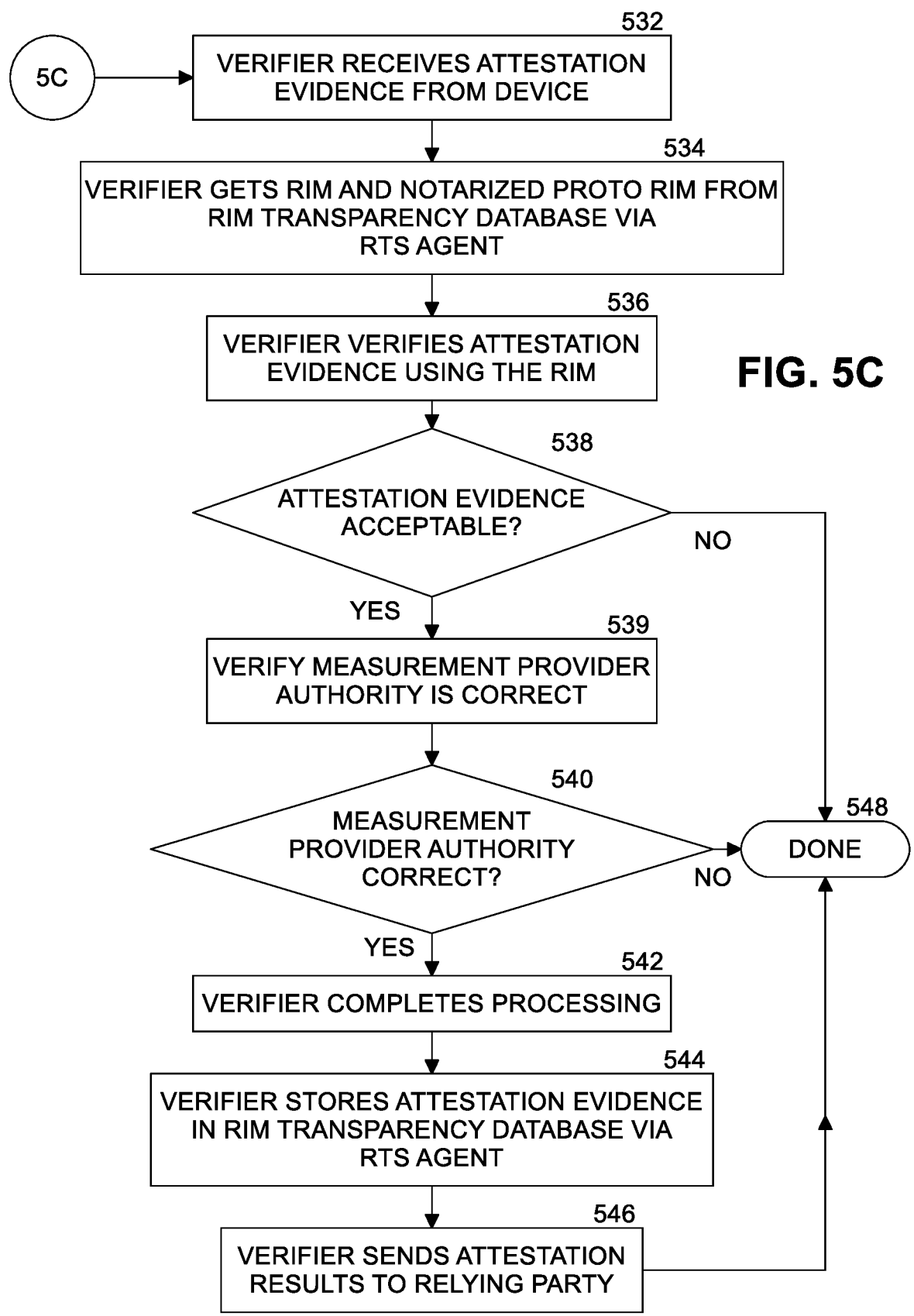

FIGS. 5A-5C illustrate attestation processing 500 in an implementation. Starting on FIG. 5A, at block 502, an Endorser (e.g., supplier 110) creates a proto-RIM 112 identifying an entity (e.g., supplier CA 106) authorized to provide RIM Reference Values for a computing device (e.g., device 128) and signs the proto-RIM with the Endorser's identity certificate (e.g., supplier ID certificate 108 supplied by supplier CA 106). At block 504, the Endorser sends the proto-RIM 112 to RTS agent 114. At block 506, RTS agent 114 updates RIM transparency database 116 with the proto-RIM 112. At block 510, RTS 118 reads the RIM transparency database 116, finds the proto-RIM 112 and checks the RIM transparency database for duplicate proto-RIMs for the computing device. At block 510, RTS 118 may perform an optional supply chain governance check as described in FIG. 6. At block 512, RTS 118 determines if a duplicate proto-RIM for the computing device is found in the RIM transparency database 116. If no duplicate proto-RIM is found, processing ends at block 514. If a duplicate proto-RIM is found, then at block 516 RTS 118 checks for a fraudulent proto-RIM. In an implementation, fraud detection may include inspecting fields of the proto-RIM (as shown in FIG. 3), validating that the supplier 110 signing the proto-RIM is authentic, correlating the proto-RIM with other data sources, and applying AI inference engine processing to detect any anomalistic telemetry data related to accesses to RIM transparency database 116. In an embodiment, other data sources may include a peer RTS system. A peer RTS System may observe the use of a proto-RIM, RIM or other RATS Architecture defined Endorsement or Reference Value that names the same components or measurements or measurement values belonging to a named measurement, where variations in the measurement values or the named measurements corresponding to a component could be an indication of fraud, failure, or other operational integrity issue.

If no fraud is detected at block 518, processing ends at block 514. This may occur when the received proto-RIM is the first proto-RIM received for the computing device (e.g., no previous proto-RIM is stored in RIM transparency database 116 for the computing device). If fraud is detected, processing continues with block 520 on FIG. 5B via connector 5B.

At block 520 on FIG. 5B, to resolve any disputes of authority, RTS 118 notarizes the proto-RIM 112. In an implementation, this may include digitally signing the proto-RIM with the current date and time to produce notarized proto-RIM 120. At block 522, RTS 118 (either directly or indirectly via RTS agent 114) stores the notarized proto-RIM 120 in RIM transparency database 116. At block 524, an Endorser (e.g., supplier 110) gets the notarized proto-RIM 120 from the RIM transparency database via a call to RTS agent 114. At block 526, the Endorser generates a RIM (with objects 218 and measurements 220) based at least in part on the notarized proto-RIM 120 and measurements 220 (e.g., Reference Values for device 128). At block 528 the Endorser signs the RIM 122 using a certified key issued by the certificate authority (CA) named in the proto-RIM 112 (e.g., supplier CA 106), or by a sub-CA that chains to the named CA. At block 530, the Endorser stores the RIM 122 in RIM transparency database 116 via RTS agent 114. Attestation processing continues at block 532 on FIG. 5C via connector 5C.

At block 532 on FIG. 5C, a Verifier (e.g., service provider 124) receives attestation Evidence 126 from a computing device (e.g., device 128). A device sends Evidence in response to a request such as when a device wishes to access a resource held by a resource provider and the resource provider wishes to vet the device to ensure the resource supplied is handled safely (e.g., protects privacy, enforces data rights management (DRM) constraints, preserves data integrity, compensates for use, etc.). Additionally, Evidence may be provided at regular intervals as a proof of operational integrity such as might be required by a watchdog timer or in response to an administrative update action that necessarily requires Evidence Verifiers to obtain updated Reference Values that correctly match updated evidence values. At block 534, to perform attestation of the computing device, the Verifier at block 534 gets the RIM 122 and the notarized proto-RIM 120 from RIM transparency database 116 via RTS agent 114. At block 536, the Verifier verifies the attestation Evidence using the RIM 122. As used herein, verification refers to verification of the RIM signer (e.g., supplier 110), not verification of the authority to supply measurement values (e.g., supplier CA 106). This authority may be inferred from the RIM signer if no indication of a different authority is contained within the RIM 122 or proto-RIM 112.

At block 538, if the attestation Evidence 126 is not acceptable, then processing ends at block 548. If the attestation Evidence 126 is acceptable, then at block 539 the Verifier verifies that the measurement provider authority (e.g., supplier CA 106) is correct. At block 540, the Verifier determines if the measurement provider authority is correct.

The Verifier at block 540 checks all avenues of measurement provider authorization: (1) authority is inferred from the RIM signer, (2) the RIM includes the authority, (3) the proto-RIM includes the authority, and (4) the Evidence includes the authority. If authority is declared in multiple places, then each place is checked for consistency. If there are inconsistencies that are undecidable, the check fails and the case is flagged for administrative inspection.

If not, processing ends at block 548. Otherwise, at block 542, the Verifier completes appraisal processing to produce Attestation Results 132. In an implementation, appraisal processing may include one or more of checking the RIM, photo-RIM, certificate or other artifact digital signatures; matching Evidence to Reference Values; augmenting accepted Evidence Claims with related endorsed Claims; evaluating trustworthiness based on accepted Claims; if trusted, augmenting accepted Claims with asserted Evidence Claims that didn't match any Reference Values; and generating Attestation Results.

At block 544, the Verifier stores the attestation Evidence 126 in RIM transparency database 116 via RTS agent 114. The evidence may be used by RTS 118 in subsequent fraud detection processing. At block 546, the Verifier sends Attestation Results 132 to a Relying Party 134.

Figure 6:
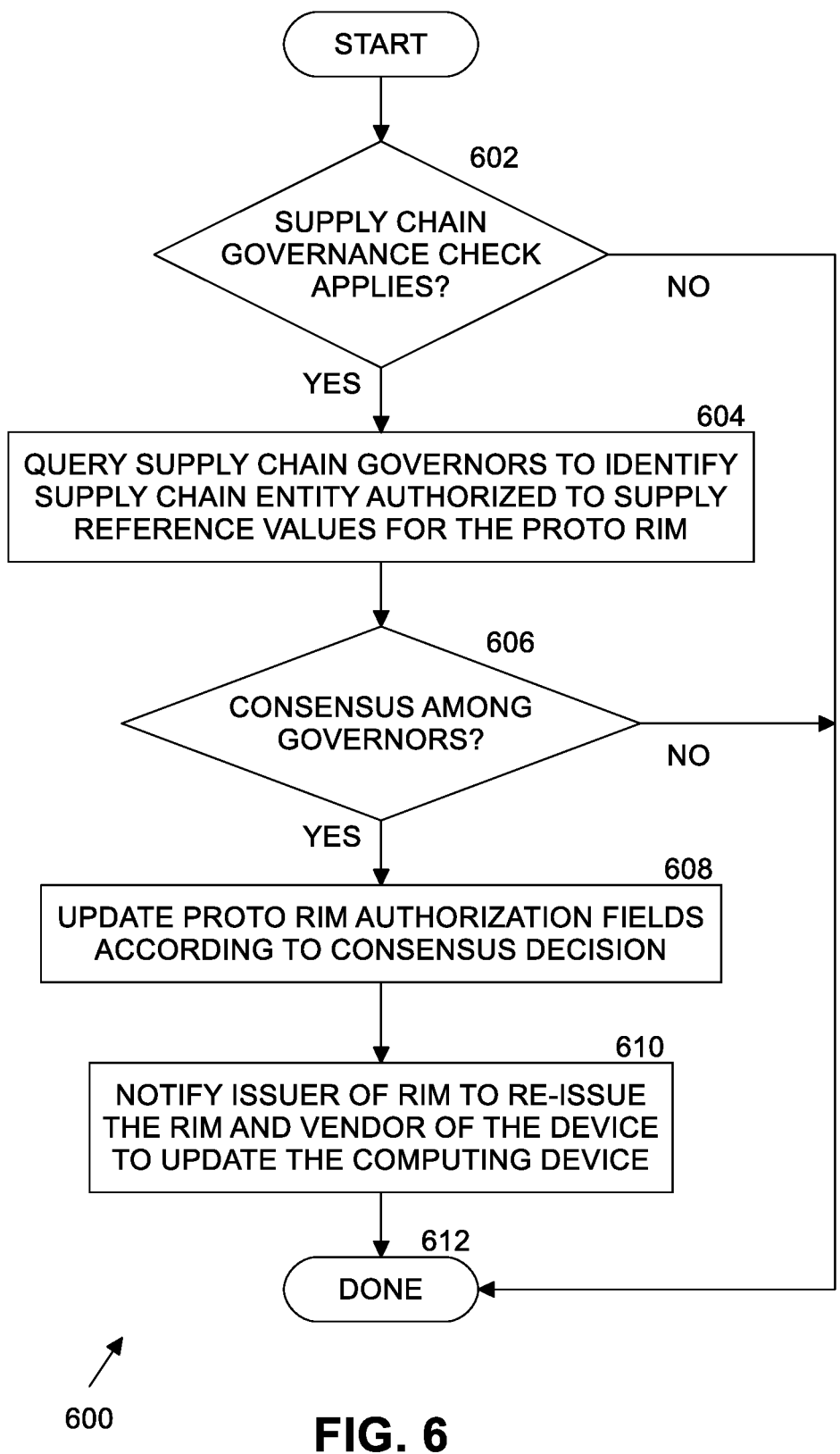
FIG. 6 illustrates supply chain governance policy check processing in an implementation.

FIG. 6 illustrates supply chain governance policy check processing 600 in an implementation. At block 602, RTS 118 determines if a supply chain governance check applies. If not, processing ends at block 612. If the supply chain governance check does apply, then at block 604, RTS 118 queries one or more supply chain governors to identify which supply chain entity (e.g., supply chain CA 102, supplier CA 106, or supplier 110) is authorized to supply Reference Values for the proto-RIM 112. Any entity in a CA chain could be authorized to supply measurement values. (e.g., entities 102, 106, 110). A proto-RIM could identify a different entity (e.g., not enumerated in FIG. 1). In an implementation, supply chain governors may be the PDB. At block 606, if there is no consensus (e.g., agreement) among the supply chain governors (e.g., they don't all identify the same supply chain entity), then processing is done at block 612. If there is a consensus/agreement, then at block 608, RTS 118 updates authorization fields (e.g., measurement authorization 322) in the proto-RIM 112 according to the consensus decision. In an implementation, the newly minted proto-RIM may be audited, resulting in a date stamp that may be used for dispute resolution at a future time.

At block 610, RTS agent (or RTS 118) notifies the issuer of the RIM 122 (e.g., supplier 110) to re-issue the RIM and the vendor of the computing device (e.g., manufacturer of device 128) to update the computing device to reflect the consensus decision. In an embodiment, updating the computing device may include updating the firmware of the computing device. Processing ends at block 612.

While an example manner of implementing the technology described herein is illustrated in FIGS. 1-6, one or more of the elements, processes, and/or devices illustrated in FIGS. 1-6 may be combined, divided, re-arranged, omitted, eliminated, and/or implemented in any other way. Further, the example computing systems shown in FIG. 1 may be implemented by hardware, software, firmware, and/or any combination of hardware, software, and/or firmware. Thus, for example, any of computing systems shown in FIG. 1 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example hardware resources is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIGS. 1-6 may include one or more elements, processes, and/or devices in addition to, or instead of, those illustrated in FIGS. 1-6, and/or may include more than one of any or all the illustrated elements, processes and devices.

Diagrams representative of example hardware logic circuitry, machine readable instructions, hardware implemented state machines, and/or any combination thereof is shown in FIGS. 1-6. The machine readable instructions may be one or more executable programs or portion(s) of an executable program for execution by processor circuitry, such as the processor circuitry 1112 shown in the example processor platform 1100 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices.

Further, although the example program is described with reference to the diagrams illustrated in FIGS. 1-6, many other methods of implementing the example computing system may alternatively be used. For example, the order of execution of the blocks may be changed, and/or some of the blocks described may be changed, eliminated, or combined. Additionally or alternatively, any or all of the blocks shown in FIGS. 1-6 may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 1-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
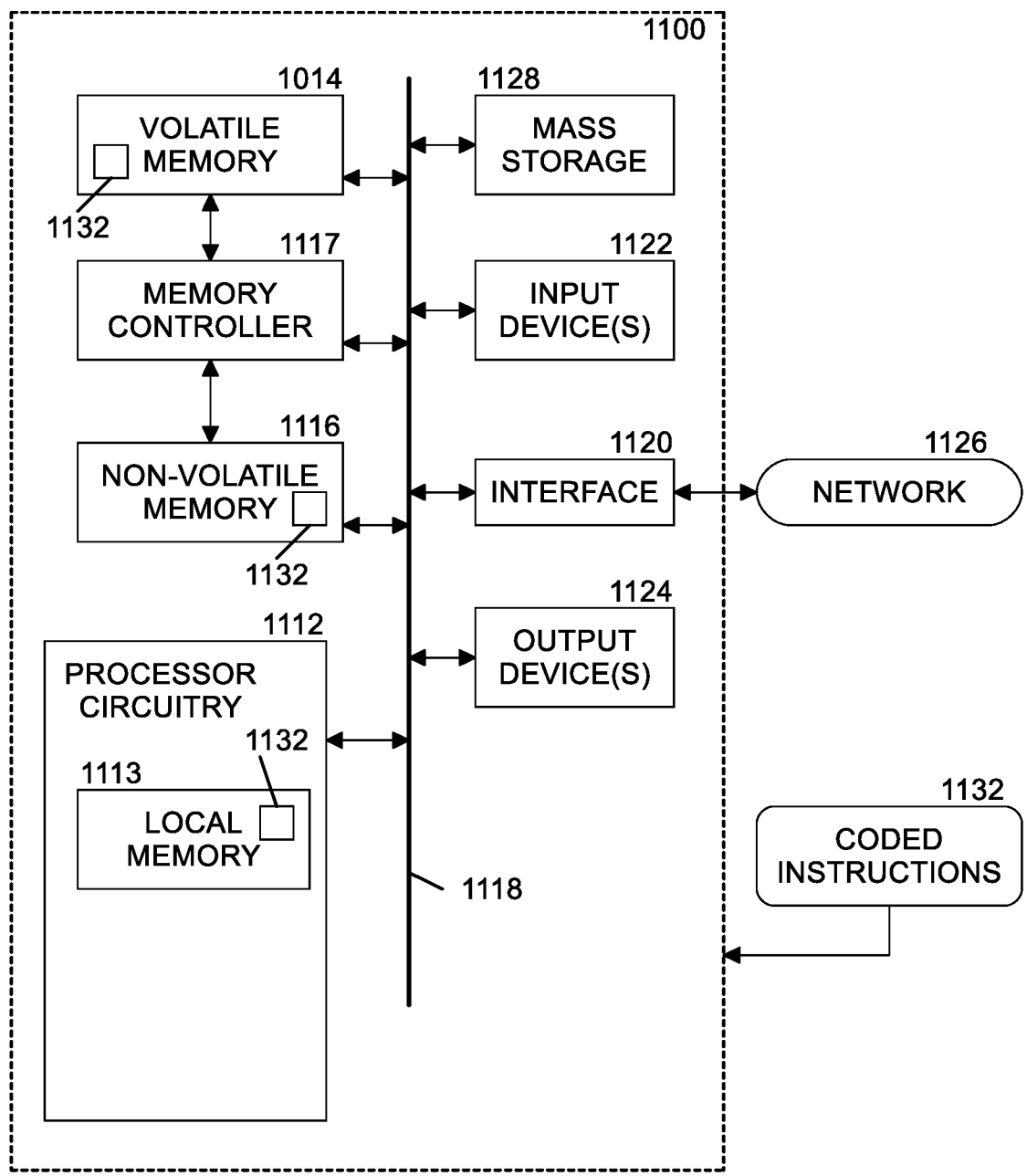
FIG. 7 is a block diagram of an example processor platform structured to execute and/or instantiate the machine-readable instructions and/or operations of FIGS. 1-6 to implement the apparatus discussed with reference to FIGS. 1-6.

FIG. 7 is a block diagram of an example processor platform 1100 structured to execute and/or instantiate the machine-readable instructions and/or operations of FIGS. 1-6. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine-readable instructions of FIGS. 1-6, may be stored in the mass storage device 1128, in the volatile memory 1114, in the non-volatile memory 1116, and/or on a removable non-transitory computer readable storage medium such as a CD or DVD.

Figure 8:
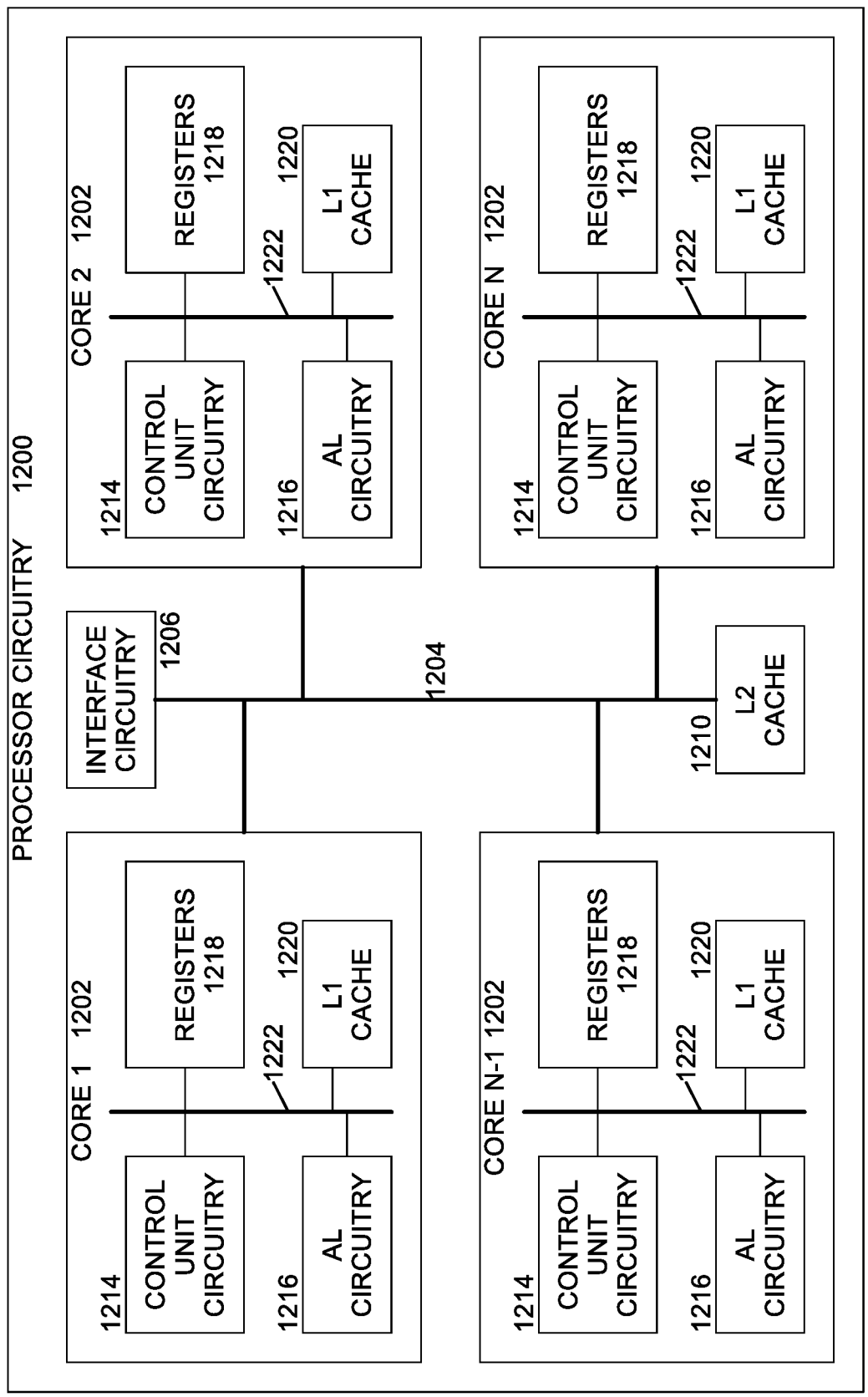
FIG. 8 is a block diagram of an example implementation of the processor circuitry of FIG. 7.

FIG. 8 is a block diagram of an example implementation of the processor circuitry 1112 of FIG. 7. In this example, the processor circuitry 1112 of FIG. 8 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all the machine-readable instructions and/or operations represented by the diagrams of FIGS. 1-6.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2) cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache in local memory 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer-based operations. In other examples, the AL circuitry 1216 also performs floating point operations. In yet other examples, the AL circuitry 1216 may include first AL circuitry that performs integer-based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 8. Alternatively, the registers 1218 may be organized in any other arrangement, format, or structure including distributed throughout the core 1202 to shorten access time. The bus 1204 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
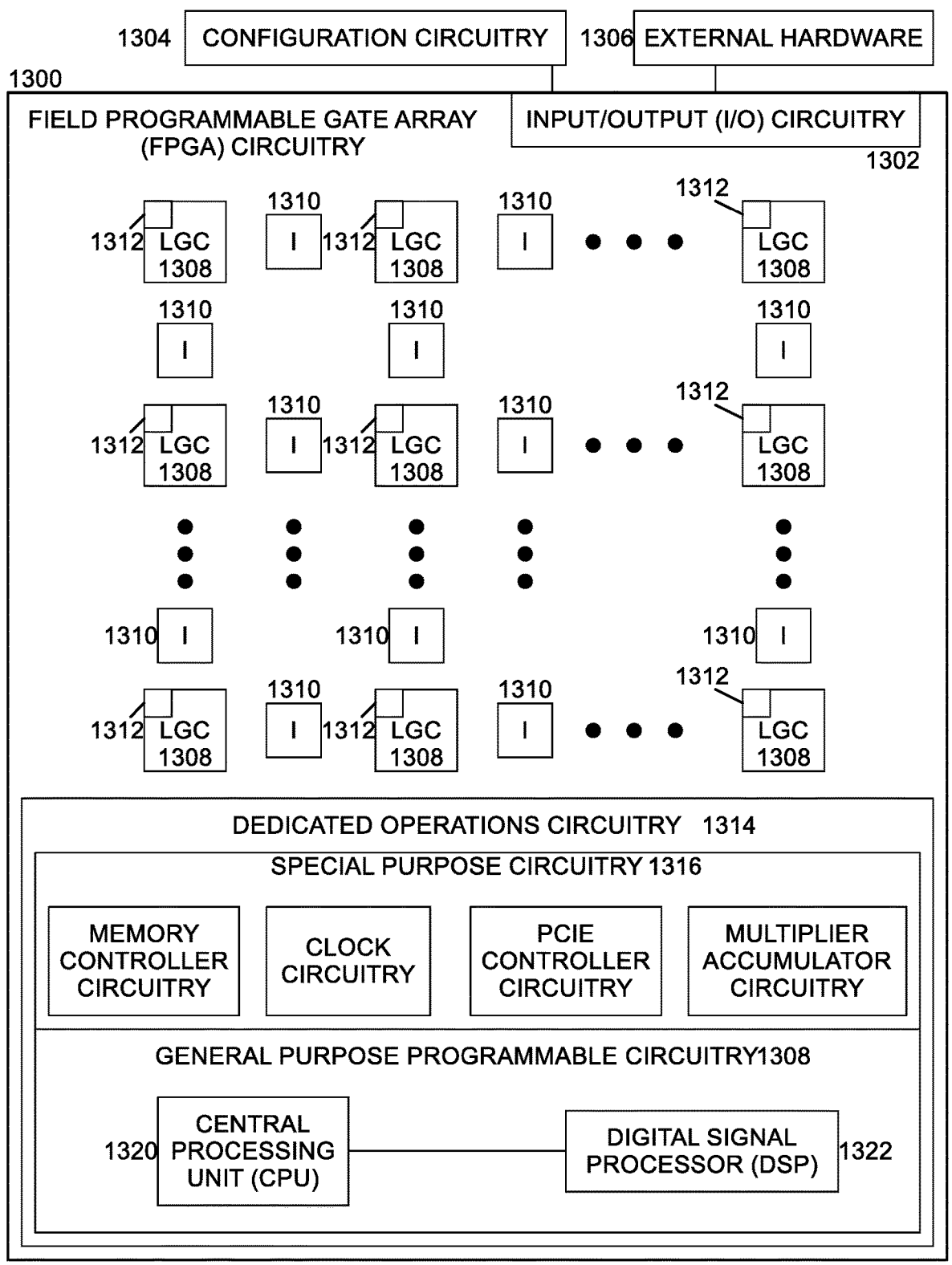
FIG. 9 is a block diagram of another example implementation of the processor circuitry of FIG. 7.

FIG. 9 is a block diagram of another example implementation of the processor circuitry 1112 of FIG. 8. In this example, the processor circuitry 1112 is implemented by FPGA circuitry 1300. The FPGA circuitry 1300 can be used, for example, to perform operations that could otherwise be performed by the example microprocessor 1200 of FIG. 9 executing corresponding machine-readable instructions. However, once configured, the FPGA circuitry 1300 instantiates the machine-readable instructions in hardware and, thus, can often execute the operations faster than they could be performed by a general-purpose microprocessor executing the corresponding software.

More specifically, in contrast to the microprocessor 1200 of FIG. 8 described above (which is a general purpose device that may be programmed to execute some or all of the machine readable instructions represented by the diagrams of FIGS. 1-6 but whose interconnections and logic circuitry are fixed once fabricated), the FPGA circuitry 1300 of the example of FIG. 9 includes interconnections and logic circuitry that may be configured and/or interconnected in different ways after fabrication to instantiate, for example, some or all of the machine-readable instructions represented by the diagrams of FIGS. 1-6. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the diagrams of FIGS. 1-6. As such, the FPGA circuitry 1300 may be structured to effectively instantiate some or all the machine-readable instructions of the diagrams of FIGS. 1-6 as dedicated logic circuits to perform the operations corresponding to those software instructions in a dedicated manner analogous to an ASIC. Therefore, the FPGA circuitry 1300 may perform the operations corresponding to the some or all the machine-readable instructions of FIGS. 1-6 faster than the general-purpose microprocessor can execute the same.

In the example of FIG. 9, the FPGA circuitry 1300 is structured to be programmed (and/or reprogrammed one or more times) by an end user by a hardware description language (HDL) such as Verilog. The FPGA circuitry 1300 of FIG. 9, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 8. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine-readable instructions of FIGS. 1-6 and/or other desired operations. The logic gate circuitry 1308 shown in FIG. 9 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 9 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 8 and 9 illustrate two example implementations of the processor circuitry 1112 of FIG. 7, many other approaches are contemplated. For example, as mentioned above, modern FPGA circuitry may include an onboard CPU, such as one or more of the example CPU 1320 of FIG. 9. Therefore, the processor circuitry 1112 of FIG. 7 may additionally be implemented by combining the example microprocessor 1200 of FIG. 8 and the example FPGA circuitry 1300 of FIG. 9. In some such hybrid examples, a first portion of the machine-readable instructions represented by the diagrams of FIGS. 1-6 may be executed by one or more of the cores 1202 of FIG. 8 and a second portion of the machine-readable instructions represented by the diagrams of FIGS. 1-6 may be executed by the FPGA circuitry 1300 of FIG. 9.

In some examples, the processor circuitry 1112 of FIG. 7 may be in one or more packages. For example, the processor circuitry 1200 of FIG. 8 and/or the FPGA circuitry 1300 of FIG. 9 may be in one or more packages. In some examples, an XPU may be implemented by the processor circuitry 1112 of FIG. 7, which may be in one or more packages. For example, the XPU may include a CPU in one package, a DSP in another package, a GPU in yet another package, and an FPGA in still yet another package.

Figure 10:
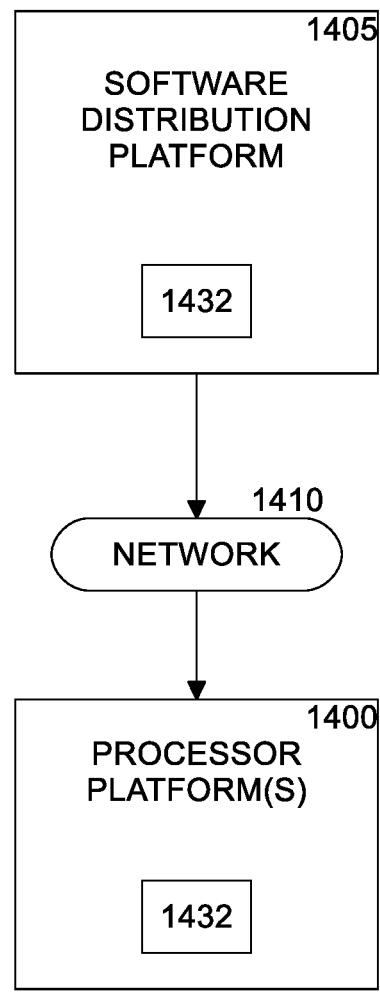
FIG. 10 is a block diagram illustrating an example software distribution platform to distribute software such as the example machine readable instructions and/or operations of FIGS. 1-6 to hardware devices owned and/or operated by third parties.

A block diagram illustrating an example software distribution platform 1405 to distribute software such as the example machine readable instructions 1132 of FIG. 7 to hardware devices owned and/or operated by third parties is illustrated in FIG. 10. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 7. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine-readable instructions 1132, which may correspond to the example machine readable instructions, as described above. The one or more servers of the example software distribution platform 1405 are in communication with a network 1410, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1132 from the software distribution platform 1405. For example, the software, which may correspond to the example machine readable instructions described above, may be downloaded to the example processor platform 1400, which is to execute the machine-readable instructions 1132 to implement the methods described above and associated computing system 902. In some examples, one or more servers of the software distribution platform 1405 periodically offer, transmit, and/or force updates to the software (e.g., the example machine readable instructions 1132 of FIG. 7) to ensure improvements, patches, updates, etc., are distributed and applied to the software at the end user devices.

In some examples, an apparatus includes means for data processing of FIGS. 1-6. For example, the means for processing may be implemented by processor circuitry, processor circuitry, firmware circuitry, other circuitry, etc. In some examples, the processor circuitry may be implemented by machine executable instructions executed by processor circuitry, which may be implemented by the example processor circuitry 1112 of FIG. 7, the example processor circuitry 1200 of FIG. 8, and/or the example Field Programmable Gate Array (FPGA) circuitry 1300 of FIG. 9. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide trusted security islands in a computing system. The disclosed systems, methods, apparatus, and articles of manufacture improve the security a computing device. The disclosed systems, methods, apparatus, and articles of manufacture are accordingly directed to one or more improvement(s) in the operation of a machine such as a computer or other electronic and/or mechanical device.

The following examples pertain to further embodiments. Specifics in the examples may be used anywhere in one or more embodiments. Example 1 is an apparatus including a memory to store a reference integrity manifest (RIM) transparency database; and a processor to receive a first RIM and a first proto-RIM from a first endorser, the first endorser asserting authority, by the first RIM and the first proto-RIM, to supply first attestation reference values for a computing device; store the first proto-RIM in the RIM transparency database; notarize the first proto-RIM; and provide the first RIM and the notarized first proto-RIM to a verifier of the computing device. In Example 2, the subject matter of Example 1 may optionally include wherein the first RIM and first proto-RIM are generated by the first endorser. In Example 3, the subject matter of Example 1 may optionally include the processor to receive the first attestation reference values as evidence of the computing device and store the evidence in the RIM transparency database. In Example 4, the subject matter of Example 3 may optionally include the processor to receive a second RIM and a second proto-RIM from a second endorser, the second endorser asserting authority, by the second RIM and the second proto-RIM, to supply second attestation reference values for the computing device; and resolve an authority dispute between the first endorser and the second endorser for the computing device based at least in part on one or more of the first RIM, first proto-RIM, second RIM, second proto-RIM, and the evidence.

In Example 5, the subject matter of Example 4 may optionally include the processor to notarize the second proto-RIM, wherein notarizing the second proto-rim includes the processor to verify the second proto-RIM and detect a fraudulent second proto-RIM. In Example 6, the subject matter of Example 1 may optionally include wherein the first proto-RIM comprises a plurality of first attestation reference values, and one or more of the plurality of first attestation references values includes an identification of the computing device and a measurement authorization. In Example 7, the subject matter of Example 1 may optionally include wherein the first endorser comprises a supplier of the computing device, the supplier issuing the first RIM and the first proto-RIM. In Example 8, the subject matter of Example 1 may optionally include wherein the processor to notarize the first proto-RIM comprises the processor to verify the first proto-RIM and detect a fraudulent first proto-RIM. In Example 9, the subject matter of Example 8 may optionally include wherein the processor to notarize the first proto-RIM comprises the processor to sign the first proto-RIM. In Example 10, the subject matter of Example 1 may optionally include wherein the RIM transparency database comprises a blockchain.

In Example 11, the subject matter of Example 1 may optionally include the processor to store the notarized first proto-RIM in the RIM transparency database. In Example 12, the subject matter of Example 11 may optionally include the processor to query a plurality of supply chain governors to identify a supply chain entity authorized to supply attestation reference values for the first proto-RIM; and update at least one measurement authorization of the first proto-RIM, notify the first endorser to re-issue the first RIM, and notify a vendor of the computing device to update the computing device with the authorized supply chain entity, when the plurality of supply chain governors agree on the supply chain entity authorized to supply attestation reference values for the first proto-RIM.

Example 13 is a method including receiving a first RIM and a first proto-RIM from a first endorser, the first endorser asserting authority, by the first RIM and the first proto-RIM, to supply first attestation reference values for a computing device; storing the first proto-RIM in a RIM transparency database; notarizing the first proto-RIM; and providing the first RIM and the notarized first proto-RIM to a verifier of the computing device. In Example 14, the subject matter of Example 13 may optionally include receiving the first attestation reference values as evidence of the computing device and storing the evidence in the RIM transparency database. In Example 15, the subject matter of Example 14 may optionally include receiving a second RIM and a second proto-RIM from a second endorser, the second endorser asserting authority, by the second RIM and the second proto-RIM, to supply second attestation reference values for the computing device; and resolving an authority dispute between the first endorser and the second endorser for the computing device based at least in part on one or more of the first RIM, first proto-RIM, second RIM, second proto-RIM, and the evidence. In Example 16, the subject matter of Example 15 may optionally include notarizing the second proto-RIM, wherein notarizing the second proto-rim includes verifying the second proto-RIM and detecting a fraudulent second proto-RIM.

In Example 17, the subject matter of Example 13 may optionally include wherein the first proto-RIM comprises a plurality of the first attestation reference values, and one or more of the plurality of first attestation references values includes an identification of the computing device and a measurement authorization. In Example 18, the subject matter of Example 13 may optionally include wherein notarizing the first proto-RIM comprises verifying the first proto-RIM and detecting a fraudulent first proto-RIM.

Example 19 is at least one machine-readable storage medium comprising instructions which, when executed by at least one processor, cause the at least one processor to receive a first RIM and a first proto-RIM from a first endorser, the first endorser asserting authority, by the first RIM and the first proto-RIM, to supply first attestation reference values for a computing device; store the first proto-RIM in a RIM transparency database; notarize the first proto-RIM; and provide the first RIM and the notarized first proto-RIM to a verifier of the computing device. In Example 20, the subject matter of Example 19 may optionally include instructions which, when executed by at least one processor, cause the at least one processor to receive the first attestation reference values as evidence of the computing device and storing the evidence in the RIM transparency database. In Example 21, the subject matter of Example 20 may optionally include instructions which, when executed by at least one processor, cause the at least one processor to receive a second RIM and a second proto-RIM from a second endorser, the second endorser asserting authority, by the second RIM and the second proto-RIM, to supply second attestation reference values for the computing device; and resolve an authority dispute between the first endorser and the second endorser for the computing device based at least in part on one or more of the first RIM, first proto-RIM, second RIM, second proto-RIM, and the evidence. In Example 22, the subject matter of Example 21 may optionally include instructions which, when executed by at least one processor, cause the at least one processor to notarize the second proto-RIM, wherein notarizing the second proto-rim includes verifying the second proto-RIM and detecting a fraudulent second proto-RIM. In Example 23, the subject matter of Example 19 may optionally include wherein the first proto-RIM comprises a plurality of the first attestation reference values, and one or more of the plurality of first attestation references values includes an identification of the computing device and a measurement authorization. In Example 24, the subject matter of Example 19 may optionally include wherein instructions to notarize the first proto-RIM comprise instructions to verify the first proto-RIM and detect a fraudulent first proto-RIM.

Example 25 is an apparatus operative to perform the method of any one of Examples 13 to 18. Example 26 is an apparatus that includes means for performing the method of any one of Examples 13 to 18. Example 27 is an apparatus that includes any combination of modules and/or units and/or logic and/or circuitry and/or means operative to perform the method of any one of Examples 13 to 18. Example 28 is an optionally non-transitory and/or tangible machine-readable medium, which optionally stores or otherwise provides instructions that if and/or when executed by a computer system or other machine are operative to cause the machine to perform the method of any one of Examples 13 to 18.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A system comprising:
    a memory to store a reference integrity manifest (RIM) transparency database; and
    a processor to:
        receive a first RIM and a first proto-RIM from a first endorser, the first endorser to assert authority, by the first RIM and the first proto-RIM, to supply first attestation reference values for a computing device;
        store the first proto-RIM in the RIM transparency database;
        notarize the first proto-RIM; and
        provide the first RIM and the notarized first proto-RIM to a verifier of the computing device.

2. The system of claim 1, wherein the first RIM and first proto-RIM are generated by the first endorser.

3. The system of claim 1, comprising the processor to receive the first attestation reference values as evidence of the computing device and store the evidence in the RIM transparency database.

4. The system of claim 3, comprising the processor to:
    receive a second RIM and a second proto-RIM from a second endorser, the second endorser to assert authority, by the second RIM and the second proto-RIM, to supply second attestation reference values for the computing device; and
    resolve an authority dispute between the first endorser and the second endorser for the computing device based at least in part on one or more of the first RIM, first proto-RIM, second RIM, second proto-RIM, and the evidence.

5. The system of claim 4, comprising the processor to notarize the second proto-RIM, wherein notarizing the second proto-rim includes the processor to verify the second proto-RIM and detect a fraudulent second proto-RIM.

6. The system of claim 1, wherein the first proto-RIM comprises a plurality of first attestation reference values, and one or more of the plurality of first attestation reference values includes an identification of the computing device and a measurement authorization.

7. The system of claim 1, wherein the first endorser comprises a supplier of the computing device, the supplier issuing the first RIM and the first proto-RIM.

8. The system of claim 1, wherein the processor to notarize the first proto-RIM comprises the processor to verify the first proto-RIM and detect a fraudulent first proto-RIM.

9. The system of claim 8, wherein the processor to notarize the first proto-RIM comprises the processor to sign the first proto-RIM.

10. The system of claim 1, wherein the RIM transparency database comprises a blockchain.

11. The system of claim 1, comprising the processor to store the notarized first proto-RIM in the RIM transparency database.

12. The system of claim 1, comprising the processor to:
    query a plurality of supply chain governors to identify a supply chain entity authorized to supply attestation reference values for the first proto-RIM; and
    update at least one measurement authorization of the first proto-RIM, notify the first endorser to re-issue the first RIM, and notify a vendor of the computing device to update the computing device with the supply chain entity, when the plurality of supply chain governors agree on the supply chain entity authorized to supply attestation reference values for the first proto-RIM.

13. A method comprising:
    receiving a first RIM and a first proto-RIM from a first endorser, the first endorser asserting authority, by the first RIM and the first proto-RIM, to supply first attestation reference values for a computing device;
    storing the first proto-RIM in a RIM transparency database;
    notarizing the first proto-RIM; and
    providing the first RIM and the notarized first proto-RIM to a verifier of the computing device.

14. The method of claim 13, comprising receiving the first attestation reference values as evidence of the computing device and storing the evidence in the RIM transparency database.

15. The method of claim 14, comprising:
    receiving a second RIM and a second proto-RIM from a second endorser, the second endorser asserting authority, by the second RIM and the second proto-RIM, to supply second attestation reference values for the computing device; and
    resolving an authority dispute between the first endorser and the second endorser for the computing device based at least in part on one or more of the first RIM, first proto-RIM, second RIM, second proto-RIM, and the evidence.

16. The method of claim 15, comprising notarizing the second proto-RIM, wherein notarizing the second proto-rim includes verifying the second proto-RIM and detecting a fraudulent second proto-RIM.

17. The method of claim 13, wherein the first proto-RIM comprises a plurality of first attestation reference values, and one or more of the plurality of first attestation reference values includes an identification of the computing device and a measurement authorization.

18. The method of claim 13, wherein notarizing the first proto-RIM comprises verifying the first proto-RIM and detecting a fraudulent first proto-RIM.

19. At least one non-transitory machine-readable storage medium comprising instructions which, when executed by at least one processor, cause the at least one processor to:
receive a first RIM and a first proto-RIM from a first endorser, the first endorser to assert authority, by the first RIM and the first proto-RIM, to supply first attestation reference values for a computing device;
store the first proto-RIM in a RIM transparency database;
notarize the first proto-RIM; and
provide the first RIM and the notarized first proto-RIM to a verifier of the computing device.

20. The at least one non-transitory machine-readable storage medium of claim 19, comprising instructions which, when executed by at least one processor, cause the at least one processor to receive the first attestation reference values as evidence of the computing device and storing the evidence in the RIM transparency database.

21. The at least one non-transitory machine-readable storage medium of claim 20, comprising instructions which, when executed by at least one processor, cause the at least one processor to:
receive a second RIM and a second proto-RIM from a second endorser, the second endorser to assert authority, by the second RIM and the second proto-RIM, to supply second attestation reference values for the computing device; and
resolve an authority dispute between the first endorser and the second endorser for the computing device based at least in part on one or more of the first RIM, first proto-RIM, second RIM, second proto-RIM, and the evidence.

22. The at least one non-transitory machine-readable storage medium of claim 21, comprising instructions which, when executed by at least one processor, cause the at least one processor to notarize the second proto-RIM, wherein notarizing the second proto-rim includes verifying the second proto-RIM and detecting a fraudulent second proto-RIM.

23. The at least one non-transitory machine-readable storage medium of claim 19, wherein the first proto-RIM comprises a plurality of the first attestation reference values, and one or more of the first attestation reference values includes an identification of the computing device and a measurement authorization.

24. The at least one non-transitory machine-readable storage medium of claim 19, wherein instructions to notarize the first proto-RIM comprise instructions to verify the first proto-RIM and detect a fraudulent first proto-RIM.

\* \* \* \* \*